US010525589B2

United States Patent
Kutsukake et al.

(10) Patent No.: US 10,525,589 B2
(45) Date of Patent: Jan. 7, 2020

(54) ROBOT SYSTEM, METHOD FOR CONTROLLING ROBOT, AND ROBOT CONTROLLER

(71) Applicant: KABUSHIKI KAISHA YASKAWA DENKI, Kitakyushu-shi (JP)

(72) Inventors: Fuminori Kutsukake, Kitakyushu (JP); Keisuke Yonehara, Kitakyushu (JP); Toshimitsu Irie, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 258 days.

(21) Appl. No.: 15/643,482

(22) Filed: Jul. 7, 2017

(65) Prior Publication Data
US 2018/0009105 A1    Jan. 11, 2018

(30) Foreign Application Priority Data

Jul. 11, 2016    (JP) ................................ 2016-136536

(51) Int. Cl.
| G05B 19/418 | (2006.01) |
| B25J 9/16 | (2006.01) |
| B25J 9/00 | (2006.01) |
| B62D 65/00 | (2006.01) |

(52) U.S. Cl.
CPC ............ *B25J 9/163* (2013.01); *B25J 9/0084* (2013.01); *B25J 9/1697* (2013.01); *B62D 65/00* (2013.01); *G05B 2219/45013* (2013.01)

(58) Field of Classification Search
CPC ........ B25J 9/163; B25J 9/0093; B25J 9/1697; B25J 9/0084; B62D 65/00; B62D 65/005; G05B 2219/45013
See application file for complete search history.

(56) References Cited

U.S. PATENT DOCUMENTS

| 4,122,525 A | 10/1978 | Eaton |
| 4,575,304 A * | 3/1986 | Nakagawa ............. B25J 9/1015 |
| | | 414/730 |

(Continued)

FOREIGN PATENT DOCUMENTS

| JP | 53-9446 | 1/1978 |
| JP | 61-253506 | 11/1986 |

(Continued)

OTHER PUBLICATIONS

Japanese Office Action for corresponding JP Application No. 2016-136536, Jan. 8, 2019 (w/ machine translation).

*Primary Examiner* — Khoi H Tran
*Assistant Examiner* — Jorge O Peche
(74) *Attorney, Agent, or Firm* — Mori & Ward, LLP

(57) ABSTRACT

A robot system includes at least one robot, a first sensor, at least one second sensor, and circuitry. The at least one robot is to work on a workpiece. The first sensor is to detect a three-dimensional shape of the workpiece. The at least one second sensor is to detect a three-dimensional position of the workpiece. The circuitry is configured to control the at least one robot based on teaching data. The circuitry is configured to correct the teaching data according to the three-dimensional shape detected by the first sensor. The circuitry is configured to correct the teaching data according to the three-dimensional position detected by the at least one second sensor.

15 Claims, 6 Drawing Sheets

(56) References Cited

U.S. PATENT DOCUMENTS

| | | | | |
|---|---|---|---|---|
| 4,670,974 A | * | 6/1987 | Antoszewski | B23P 19/007 29/701 |
| 4,831,561 A | * | 5/1989 | Utsumi | G05B 19/4015 356/621 |
| 4,869,935 A | * | 9/1989 | Hayashi | B05C 9/08 427/8 |
| 5,067,086 A | * | 11/1991 | Yamazaki | B23K 26/046 219/121.79 |
| 5,131,754 A | * | 7/1992 | Hasegawa | G01B 11/00 356/614 |
| 5,640,750 A | * | 6/1997 | Yoshida | B23Q 7/1426 29/281.5 |
| 5,724,743 A | * | 3/1998 | Jackson | G01B 11/2755 33/203.18 |
| 5,802,202 A | * | 9/1998 | Yamada | G06T 7/70 382/154 |
| 5,809,658 A | * | 9/1998 | Jackson | G01B 11/2755 33/203.18 |
| 5,876,803 A | * | 3/1999 | Hissen | G05B 19/4103 118/313 |
| 2003/0090483 A1 | * | 5/2003 | Watanabe | B25J 9/1671 345/419 |
| 2003/0144765 A1 | * | 7/2003 | Habibi | B25J 9/1697 700/259 |
| 2004/0071961 A1 | * | 4/2004 | Jevons | B60J 5/00 428/343 |
| 2004/0158358 A1 | * | 8/2004 | Anezaki | G05D 1/0221 700/264 |
| 2004/0172164 A1 | * | 9/2004 | Habibi | B25J 9/1692 700/245 |
| 2004/0199288 A1 | * | 10/2004 | Watanabe | B25J 9/1671 700/245 |
| 2005/0107920 A1 | * | 5/2005 | Ban | B25J 9/1692 700/245 |
| 2005/0143861 A1 | * | 6/2005 | Watanabe | B25J 9/1684 700/264 |
| 2006/0069464 A1 | * | 3/2006 | Nagatsuka | G05B 19/425 700/253 |
| 2008/0240511 A1 | * | 10/2008 | Ban | B25J 9/1697 382/108 |
| 2010/0198492 A1 | * | 8/2010 | Watanabe | B60W 40/12 701/124 |
| 2012/0215348 A1 | * | 8/2012 | Skrinde | B08B 9/049 700/245 |
| 2014/0031982 A1 | * | 1/2014 | Yamada | B25J 9/1676 700/255 |
| 2014/0293268 A1 | * | 10/2014 | Lee | G01P 3/36 356/28 |
| 2015/0336221 A1 | * | 11/2015 | Mc Kay | B23K 26/244 228/212 |
| 2016/0059854 A1 | * | 3/2016 | Ohsugi | B60W 10/20 701/50 |
| 2017/0008174 A1 | * | 1/2017 | Rosen | B25J 9/1697 |
| 2017/0203434 A1 | * | 7/2017 | Ueda | B25J 9/0081 |
| 2018/0222056 A1 | * | 8/2018 | Suzuki | B25J 15/0014 |
| 2018/0372841 A1 | * | 12/2018 | Hieida | G01S 13/86 |
| 2019/0017939 A1 | * | 1/2019 | Kim | B05C 9/14 |
| 2019/0039237 A1 | * | 2/2019 | Nakashima | B25J 9/1697 |
| 2019/0047149 A1 | * | 2/2019 | Wouhaybi | B25J 9/1682 |
| 2019/0061705 A1 | * | 2/2019 | Blackstock | B60S 3/004 |
| 2019/0193947 A1 | * | 6/2019 | Koga | G06T 7/75 |
| 2019/0225430 A1 | * | 7/2019 | Ooba | B65G 43/00 |

FOREIGN PATENT DOCUMENTS

| | | | |
|---|---|---|---|
| JP | 61253506 A | * | 11/1986 |
| JP | 63-260781 | | 10/1988 |
| JP | 2001-000905 | * | 1/2001 |
| WO | WO 2009/025271 | | 2/2009 |

* cited by examiner

ROBOT SYSTEM, METHOD FOR CONTROLLING ROBOT, AND ROBOT CONTROLLER

CROSS-REFERENCE TO RELATED APPLICATIONS

The present application claims priority under 35 U.S.C. § 119 to Japanese Patent Application No. 2016-136536, filed Jul. 11, 2016. The contents of this application are incorporated herein by reference in their entirety.

BACKGROUND

Field of the Invention

The embodiments disclosed herein relate to a robot system, a method for controlling a robot, and a robot controller.

Discussion of the Background

Japanese Unexamined Patent Application Publication No. 2001-905A1 discloses a sealant applier. The sealant applier includes a sealant application robot, a camera, measuring means, storing means, and correcting means. The sealant application robot is located adjacent to a conveyance line and includes a sealant gun that memorizes by teaching a sealant application position at which the sealant gun applies a sealant to a vehicle body. The camera is mounted on the sealant application robot. The measuring means measures a three-dimensional current position of the vehicle body in a non-contact manner based on an image picked up by the camera. The storing means stores a reference position of the sealant application robot. The correcting means compares the current position of the vehicle body obtained by the measuring means with the reference position of the sealant application robot stored in the storing means, and corrects teaching data based on a result of the comparison.

SUMMARY

According to one aspect of the present disclosure, a robot system includes at least one robot, a first sensor, at least one second sensor, and circuitry. The at least one robot is to work on a workpiece. The first sensor is to detect a three-dimensional shape of the workpiece. The at least one second sensor is to detect a three-dimensional position of the workpiece. The circuitry is configured to control the at least one robot based on teaching data. The circuitry is configured to correct the teaching data according to the three-dimensional shape detected by the first sensor. The circuitry is configured to correct the teaching data according to the three-dimensional position detected by the at least one second sensor.

According to another aspect of the present disclosure, a method for controlling a robot includes controlling the robot to work on a workpiece according to teaching data. A three-dimensional shape of the workpiece that is detected. The teaching data is corrected according to the three-dimensional shape. A three-dimensional position of the workpiece is detected. The teaching data is corrected according to the three-dimensional position.

According to further aspect of the present disclosure, a robot controller includes first circuitry, second circuitry, and third circuitry. The first circuitry is configured to control a robot to work on a workpiece according to teaching data. The second circuitry is configured to correct the teaching data according to a three-dimensional shape of the workpiece. The third circuitry is configured to correct the teaching data according to a three-dimensional position of the workpiece.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
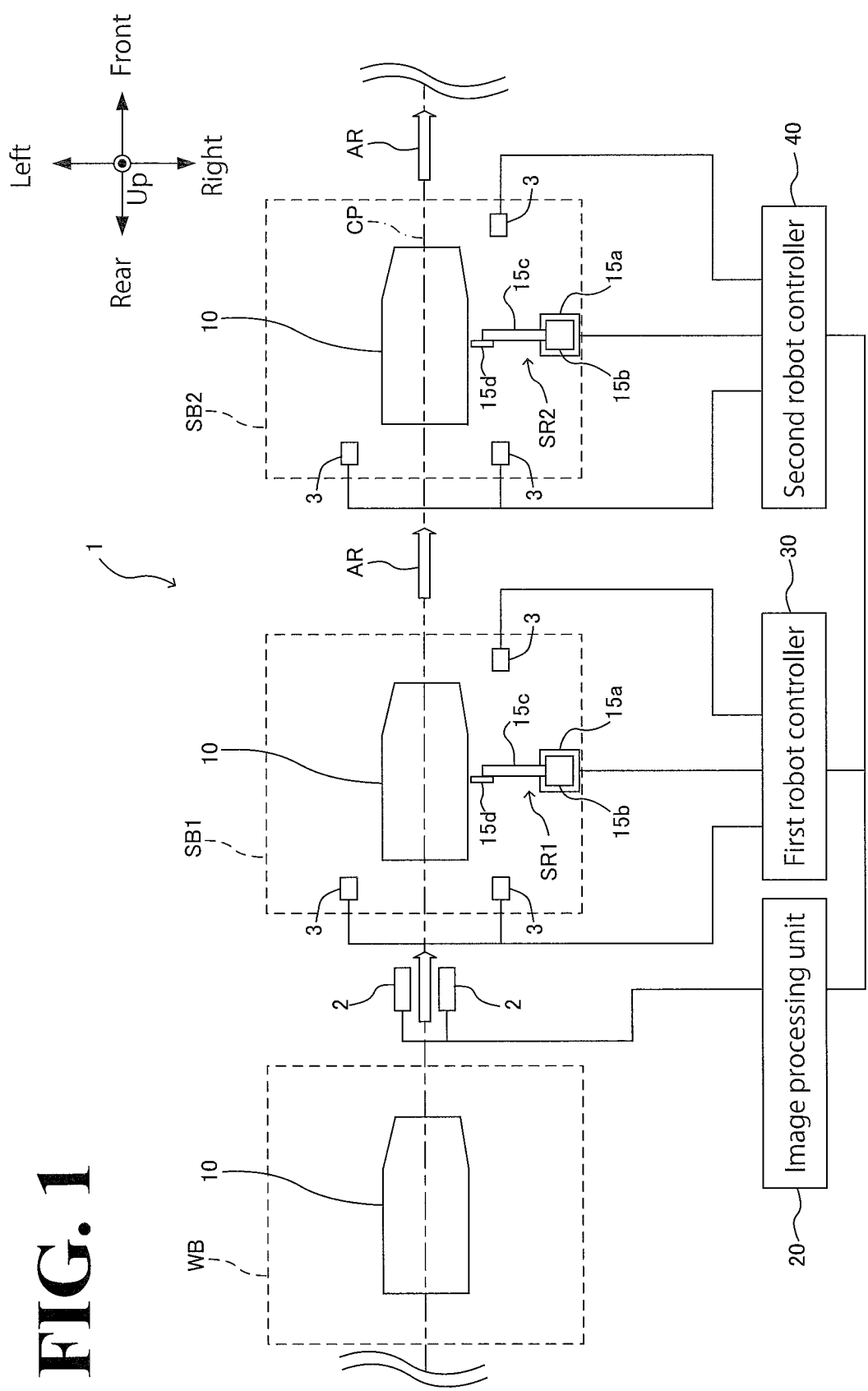
FIG. 1 is a plan view of a robot system according to an embodiment.

The embodiments will now be described with reference to the accompanying drawings, wherein like reference numerals designate corresponding or identical elements throughout the various drawings.

To facilitate the description of the robot system and associated elements, the following description uses "up", "down", "right", "left", "front", "rear", and other terms that indicate a direction. These terms of direction, however, should not be construed as limiting the arrangement of the robot system and associated elements.

1. General Arrangement of Robot System

By referring to FIGS. 1 and 2, a general arrangement of a robot system 1 according to this embodiment will be described. In this embodiment, work that the robot system 1 performs is to apply a sealant from a sealing robot to automobile bodies on a production line of automobiles.

Figure 2:
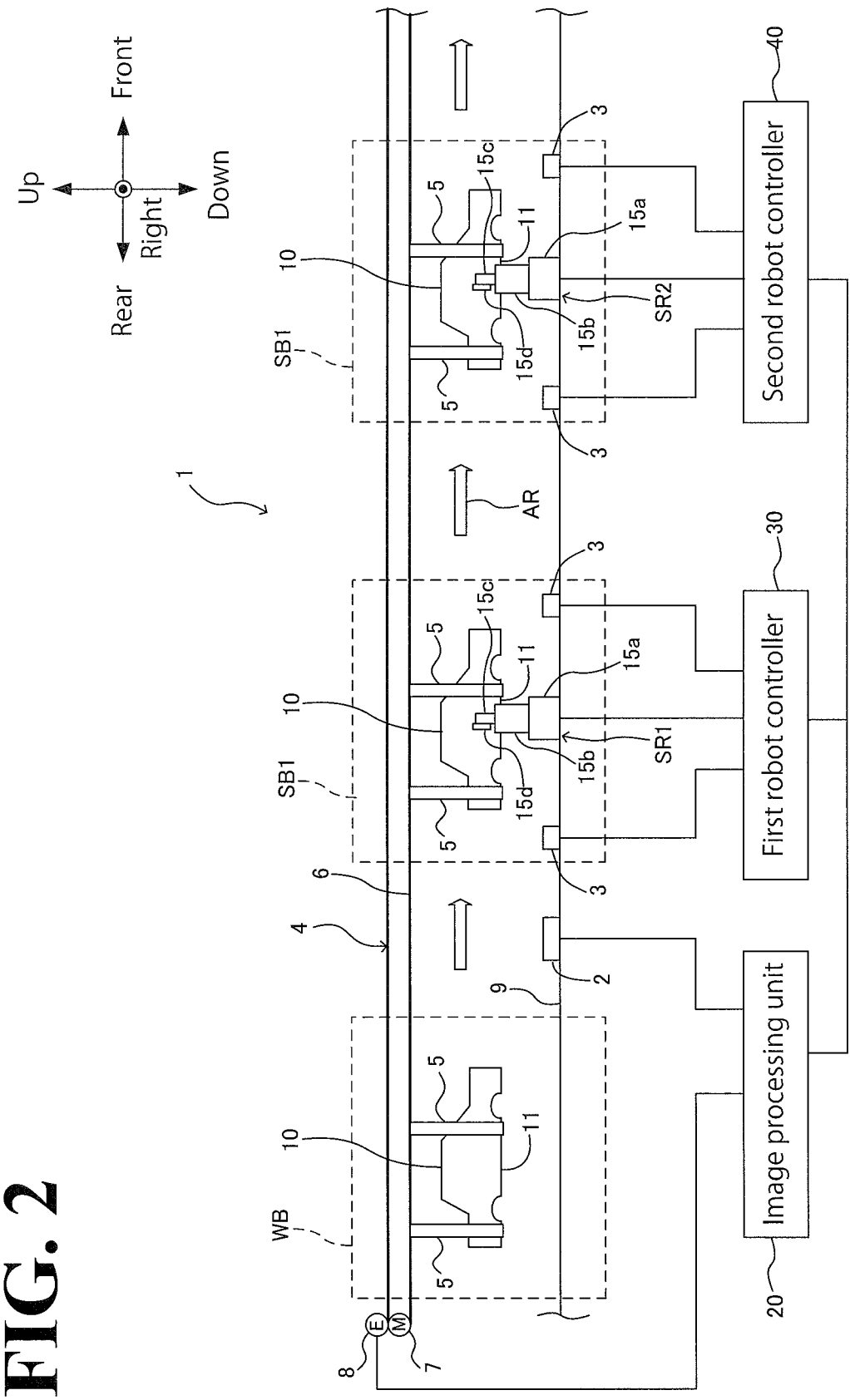
FIG. 2 a side view of the robot system according to the embodiment.

As illustrated in FIGS. 1 and 2, the robot system 1 includes sealing robots SR1 and SR2, three-dimensional sensors 2, cameras 3, a conveyor 4 (see FIG. 2), an image processing unit 20, and robot controllers 30 and 40.

In this embodiment, the robot system 1 includes two sealing robots, namely, a first sealing robot SR1 (which is a non-limiting example of the robot recited in the appended claims) and a second sealing robot SR2 (which is a non-limiting example of the robot recited in the appended claims). The first sealing robot SR1 and the second sealing robot SR2 each perform sealant application work with respect to, for example, a bottom 11 of an automobile body 10. The sealant application work is a non-limiting example of the predetermined work recited in the appended claims. The bottom 11 is a non-limiting example of the "portion of the workpiece that is to be subjected to the predetermined work" recited in the appended claims. The automobile body 10 is a non-limiting example of the workpiece recited in the appended claims. The bottom 11 of the body 10 is composed of a plurality of panels joined together (such as by spot welding), and the sealant is used to seal the connection portions of the plurality of panels.

The conveyor 4 is movable in an intermittent manner to convey the body 10 along a conveyance passage CP (indicated by a single-dashed line in FIG. 1). The arrows AR illustrated in FIGS. 1 and 2 indicate the conveyance direction. A first sealing booth SB1 and a second sealing booth SB2 are disposed at stopping positions at which the conveyance of the body 10 is stopped. The first sealing booth SB1 and the second sealing booth SB2 are work booths for the sealant application work. The first sealing booth SB1 is disposed further upstream than the second sealing booth SB2. The first sealing robot SR1 is disposed in the first sealing booth SB1, and the second sealing robot SR2 is disposed in the second sealing booth SB2. In each booth, the sealing robot performs the sealant application work with respect to a different portion of the bottom 11. At the upstream side of the first sealing booth SB1, a work booth WB is disposed. The work booth WB is for work previous to the sealant application work (for example, welding of the panels of the body 10). The booths WB, SB1, and SB2 are aligned approximately at equal intervals along the conveyance passage CP.

In another possible embodiment, the number of the sealing booths SB may be one or may be three or more. In still another possible embodiment, the upstream work booth WB may not necessarily be provided. In still another possible embodiment, two or more sealing robots may be provided in each of the first sealing booth SB1 and the second sealing booth SB2.

As illustrated in FIG. 2, the conveyor 4 (which is a non-limiting example of the conveyance unit recited in the appended claims) is disposed above a floor 9 and conveys the body 10 along the conveyance passage CP with the body 10 suspended from the conveyor 4. The conveyor 4 includes pairs of hangers 5 at a plurality of positions on the conveyor 4. Each pair of hangers 5 supports the bottom 11 of the body 10 at two portions, a front portion and a rear portion, of the bottom 11 along the conveyance passage CP. The interval between each pair of hangers 5 and other pair of hangers 5 is approximately equivalent to the interval between the booths WB, SB1, and SB2. The body 10 is supported by the pair of hangers 5 with, for example, the length direction of the body 10 oriented in the conveyance direction and with the front of the body 10 facing the downstream side in the conveyance direction.

The conveyor 4 includes the plurality of pairs of hangers 5, a chain belt 6, and a motor 7. From the chain belt 6, the plurality of pairs of hangers 5 are suspended along the conveyance passage CP. The motor 7 drives the chain belt 6 into movement in the conveyance direction. The motor 7 includes an encoder 8 (which is a non-limiting example of the third sensor recited in the appended claims). The encoder 8 detects the rotation speed of the motor 7 to detect the conveyance speed at which the body 10 is conveyed by the conveyor 4. The conveyor 4 is capable of intermittent movement implemented by the motor 7, and conveys the body 10 from the work booth WB to the first sealing booth SB1 and stops the body 10 in the first sealing booth SB1. Then, the conveyor 4 conveys the body 10 from the first sealing booth SB1 to the second sealing booth SB2 and stops the body 10 in the second sealing booth SB2. Then, the conveyor 4 conveys the body 10 from the second sealing booth SB2 to a downstream work booth (not illustrated) for work following the sealant application work. Thus, the conveyor 4 conveys the body 10 in an intermittent manner along the conveyance passage CP.

While in this embodiment the body 10 is suspended from the conveyor 4 during conveyance, this configuration is not intended in a limiting sense. Another possible configuration is a conveyor or a similar unit that is installed on the floor and that causes the body 10 on a carriage to make an orbit. In this case, it is possible to provide a pit in the floor 9 and place the sealing robot in the pit so that the sealing robot performs the sealant application work from under the bottom 11 of the body 10. The pit, however, may not necessarily be provided, in which case the sealant application work may be performed with respect to the interior of the body 10, for example. While in this embodiment the conveyor 4 is a chain belt, the conveyor 4 may be other than a chain belt insofar as the conveyor 4 is capable of obtaining from a value from the encoder (that is, from the rotation amount of the motor) the distance over which the workpiece has been conveyed and the speed of conveyance.

The three-dimensional sensors 2 (which are non-limiting examples of the first sensor recited in the appended claims) are disposed at positions where the body 10 moving along the conveyance passage CP is detectable by the three-dimensional sensors 2. Specifically, in this embodiment, the three-dimensional sensors 2 are disposed between the work booth WB and the first sealing booth SB1. With this arrangement, the three-dimensional sensors 2 are capable of detecting a three-dimensional shape of the bottom 11 of the body 10. The three-dimensional sensors 2 are fixed to the floor 9. Generally, three-dimensional sensors have a limited range of detection. In view of this situation, in this embodiment, two three-dimensional sensors 2 are aligned in the width direction of the body 10 (in the vertical direction in FIG. 1) with a predetermined gap between three-dimensional sensors 2. This configuration enables an entirety of the bottom 11 to be detected in the width direction of the body 10. Specifically, while the body 10 is being conveyed from the work booth WB to the first sealing booth SB1, the two three-dimensional sensors 2, which are disposed under the body 10, cooperate to detect a three-dimensional shape of the bottom 11 of the body 10. The three-dimensional shape of the bottom 11 detected by the three-dimensional sensors 2 is output to the image processing unit 20.

There is no particular limitation to the kind of the three-dimensional sensors 2. One example is a laser sensor that detects a three-dimensional shape by line laser scanning. It is possible to use a single three-dimensional sensor 2 when an entirety of the bottom 11 is detectable in the width direction of the body 10 using a single three-dimensional sensor 2. It is also possible to use three or more three-dimensional sensors 2 when the width of the body 10 is so large as to necessitate three or more three-dimensional sensors 2.

Three cameras 3 (which are non-limiting examples of the second sensor recited in the appended claims) are disposed in the booth SB1 to detect three-dimensional positions of the body 10 for the first sealing robot SR1 to perform the sealant application work with respect to the body 10 in the booth SB1. Three cameras 3 (which are non-limiting examples of the second sensor recited in the appended claims) are disposed in the booth SB2 to detect three-dimensional positions of the body 10 for the second sealing robot SR2 to perform the sealant application work with respect to the body 10 in the booth SB2. In this embodiment, the three cameras 3 in the first sealing booth SB1 are fixed to the floor 9 with two of the three cameras 3 being adjacent to the rear side in the first sealing booth SB1 and one of the three cameras 3 being adjacent to the front side in the first sealing booth SB1. The two rear cameras 3, which are disposed at rear portions of the first sealing booth SB1, sandwich the body 10 in its width direction (in the vertical direction in FIG. 1). The one front camera 3 is disposed at a front-right portion of the first sealing booth SB1 in this embodiment. This arrangement of the three cameras 3 also applies in the three cameras 3 in the second sealing booth SB2. The three-dimensional positions of the body 10 detected by the cameras 3 in the first sealing booth SB1 are output to the first robot controller 30, and the three-dimensional positions of the body 10 detected by the cameras 3 in the second sealing booth SB2 are output to the second robot controller 40.

The number of the cameras 3 in each of the booths SB1 and SB2 will not be limited to three; two or four cameras 3 are possible when they are necessary for detecting three-dimensional positions of the body 10. It should be noted, however, that three or more cameras 3 are preferable in terms of detection accuracy. In another possible embodiment, the arrangement of the three cameras 3 may be other than the above-described arrangement. In another possible embodiment, the cameras 3 may be, instead of being fixed to the floor 9, mounted on the sealing robot or another robot so that the cameras 3 are movable during detection. In another possible embodiment, a position sensor different from the cameras 3 may be used insofar as the position sensor is capable of detecting a three-dimensional position of the body 10.

The first sealing robot SR1 is disposed in the first sealing booth SB1 or may be fixed to the floor 9 or made movable in such directions as frontward, rearward, rightward, and leftward by a robot movement device, not illustrated. The first sealing robot SR1 includes a base 15a, a turnable head 15b, an arm 15c, and a sealing gun 15d. The turnable head 15b is disposed over the base 15a and turnable on the base 15a. The arm 15c is connected to the turnable head 15b and has multiple articulations in this embodiment. The sealing gun 15d is mounted on the leading end of the arm 15c. The first sealing robot SR1 is controlled by the first robot controller 30 to: make the sealing gun 15d approach the bottom 11 of the body 10 that has been conveyed to and is standing by in the first sealing booth SB1; and make the sealing gun 15d spray a sealant onto the seams of the panels of the bottom 11, thereby sealing the seams.

The second sealing robot SR2 is disposed in the second sealing booth SB2 or may be fixed to the floor 9 or made movable in such directions as frontward, rearward, rightward, and leftward by a robot movement device, not illustrated. The second sealing robot SR2 includes a base 15a, a turnable head 15b, an arm 15c, and a sealing gun 15d, similarly to the first sealing robot SR1. The second sealing robot SR2 is controlled by the second robot controller 40 to: make the sealing gun 15d approach the bottom 11 of the body 10 that has been conveyed to and is standing by in the second sealing booth SB2; and make the sealing gun 15d spray a sealant onto an un-sealed portion(s) of the seams of the panels of the bottom 11 (a portion that remains un-sealed in the first sealing booth SB1), thereby sealing the un-sealed portion(s) of the seams.

2. Configurations of Automobile Body and Hangers

By referring to FIG. 3, an exemplary configuration of the automobile body 10 and an exemplary configuration of the hangers 5 will be described.

Figure 3:
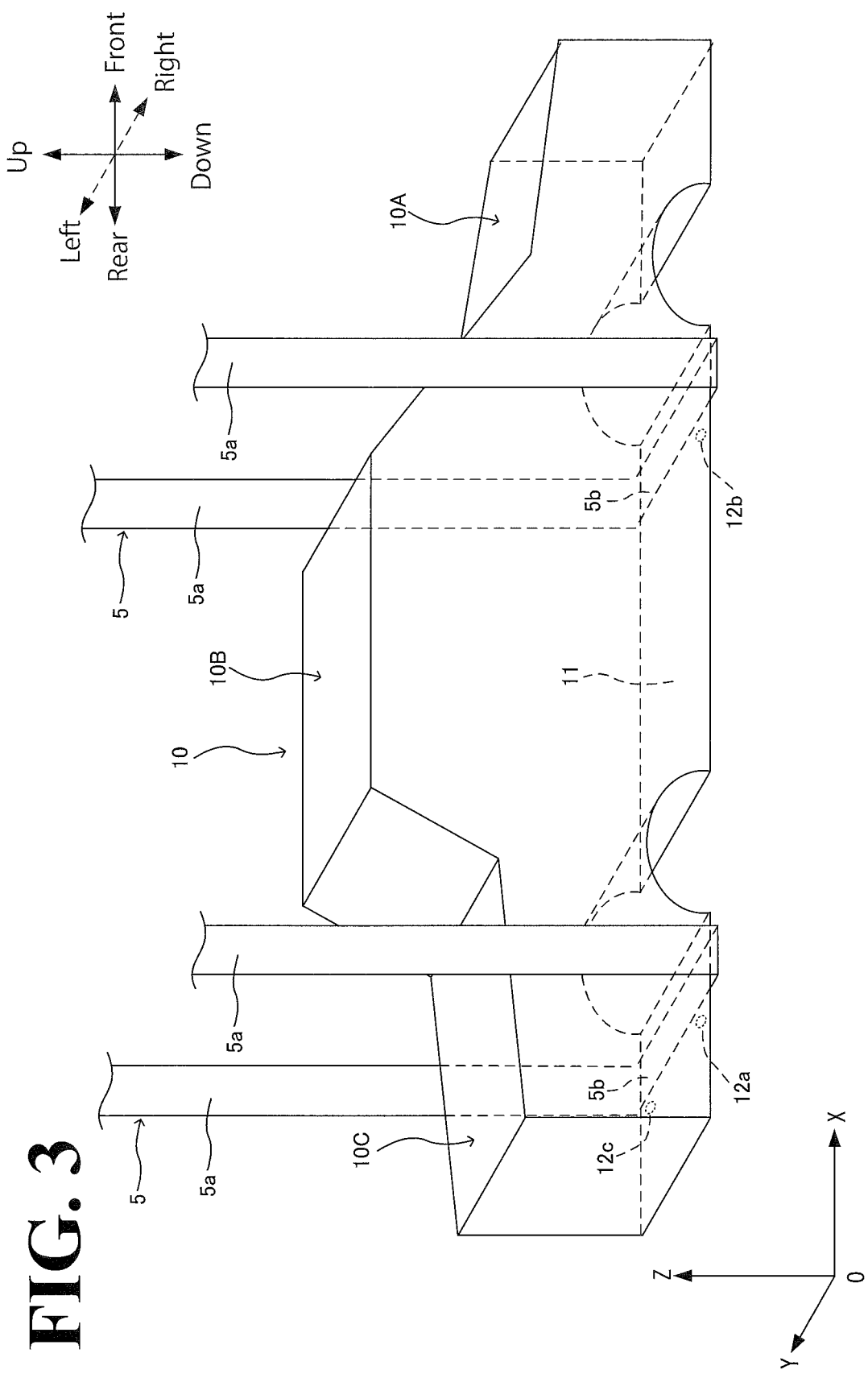
FIG. 3 illustrates an exemplary automobile body and exemplary hangers.

As illustrated in FIG. 3, the automobile body 10 includes a front portion 10A, a middle portion 10B, and a rear portion 10C. The front portion 10A includes a hood. The middle portion 10B includes a driver-passenger space. The rear portion 10C includes a trunk. The bottom 11 of the body 10 is made up of a plurality of panels welded together to cover the front portion 10A, the middle portion 10B, and the rear portion 10C, and thus constitutes the lower surface of an entirety of the body 10.

Each hanger 5 includes a pair of vertical frames 5a and a horizontal frame 5b. The horizontal frame 5b extends across the lower ends of the pair of vertical frames 5a. The horizontal frame 5b has a positioning pin (not illustrated) fittable with a positioning hole (not illustrated) disposed on the bottom 11 of the body 10. With the positioning pin fitted with the positioning hole, the position of the body 10 is determined at a predetermined loading position at which the body 10 is loaded on the pair of hangers 5.

The bottom 11 includes a plurality of position-detecting reference holes 12. The reference holes 12 include three reference holes 12a, 12b, and 12c. The reference hole 12a is disposed at a right portion of the rear part of the bottom 11. The reference hole 12c is disposed at a left portion of the rear part of the bottom 11. The reference hole 12b is disposed at a right portion of the front part of the bottom 11. The three reference holes 12a, 12b, and 12c are detected by the three cameras 3, and information of the detected reference holes 12a, 12b, and 12c is output to the first robot controller 30 and the second robot controller 40. Using the information of the detected reference holes 12a, 12b, and 12c, position measurers 31 and 41 (see FIG. 4, described later) respectively of the first robot controller 30 and the second robot controller 40 determines current positions of the body 10 in the booths SB1 and SB2.

The number of the reference holes on the bottom 11 of the body 10 may be other than three, and the positions of the reference holes may be other than the above-described positions. Moreover, the reference holes may be other than holes, non-limiting examples including a depression, a protrusion shape, and a mark, insofar as they reliably serve as reference for position detection.

3. Functions of Image Processing Unit and Robot Controller

By referring to FIG. 4, functions of the image processing unit 20 and the first robot controller 30 and the second robot controller 40 will be described.

Figure 4:
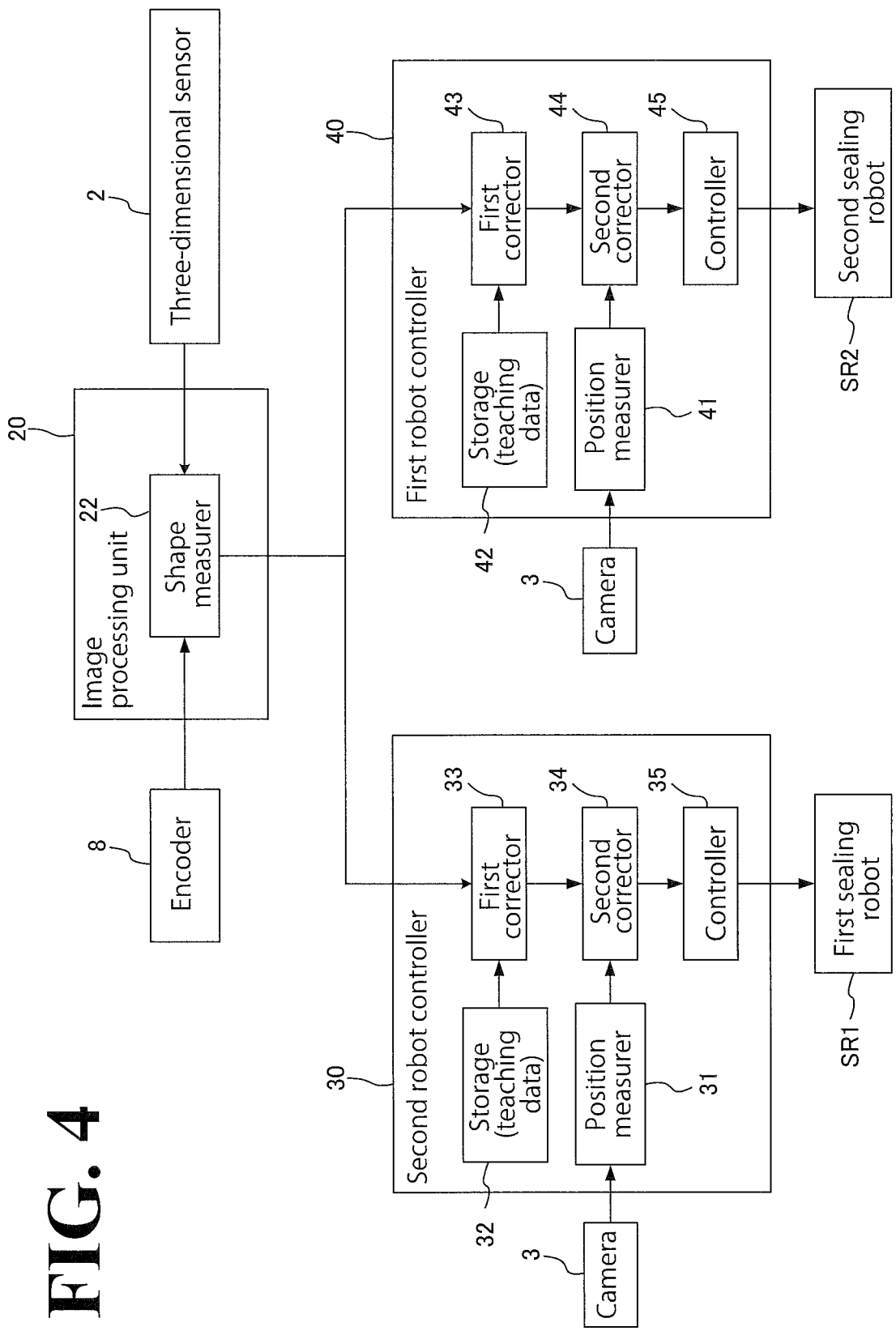
FIG. 4 is a block diagram of exemplary functions of an image processing unit and a robot controller.

As illustrated in FIG. 4, the image processing unit 20 includes a shape measurer 22. The shape measurer 22 receives: from the three-dimensional sensors 2, information of the three-dimensional shape of the bottom 11; and from the encoder 8, information of the conveyance speed at which the body 10 is conveyed by the conveyor 4. Based on the three-dimensional shape of the bottom 11 detected by the three-dimensional sensors 2 and based on the conveyance speed of the body 10 detected by the encoder 8, the shape measurer 22 performs predetermined image processing to measure a three-dimensional shape of the bottom 11. By inputting information of the conveyance speed of the body 10 into the shape measurer 22 from the encoder 8, the influence of a change, if any, in the conveyance speed of the body 10 is eliminated, resulting in improved accuracy in the measurement of a three-dimensional shape. This configuration improves accuracy in identifying the positions of the reference holes 12a, 12b, and 12c, which are formed on the bottom 11, and in determining the positions at which to apply a sealant based on the reference holes 12a, 12b, and 12c. The three-dimensional shape of the bottom 11 measured by the shape measurer 22 is output to the first robot controller 30 and the second robot controller 40.

The first robot controller 30 (which is a non-limiting example of the robot controller recited in the appended claims) includes a position measurer 31, a storage 32, a first corrector 33, a second corrector 34, and a controller 35.

The storage 32 stores information such as teaching data that specifies the sealing operation performed by the first sealing robot SR1 in the first sealing booth SB1.

Based on the three-dimensional shape of the bottom 11 measured by the shape measurer 22, the first corrector 33 corrects the teaching data obtained from the storage 32. This is because each individual body 10 has a different three-dimensional shape of the bottom 11 resulting from impreciseness in the machining of the parts constituting the bottom 11. Specifically, the distance between the reference holes 12a, 12b, and 12c may not necessarily be as designed, or the positions at which to apply a sealant based on the reference holes 12a, 12b, and 12c may vary from body 10 to body 10. In view of this situation, the first corrector 33 compares the three-dimensional shape of the bottom 11 measured by the shape measurer 22 with a reference three-dimensional shape (which is, for example, stored in advance in the storage 32), and corrects the teaching data based on the difference between the three-dimensional shapes. This configuration minimizes the influence of an individual difference that each body 10 has.

The position measurer 31 performs predetermined three-dimensional measurement processing based on the three-dimensional positions of the body 10 detected by the cameras 3 so as to measure a three-dimensional position of the bottom 11 of the body 10. In this manner, a three-dimensional coordinate system having a reference point O (origin) located at a predetermined position in the first sealing booth SB1 as illustrated in, for example, FIG. 3, is established, and the reference holes 12a, 12b, and 12c on the bottom 11 are identified in the three-dimensional coordinate system in terms of coordinates. Thus, the reference holes 12a, 12b, and 12c are measured.

Based on the coordinates of the reference holes 12a, 12b, and 12c measured by the position measurer 31, the second corrector 34 corrects the teaching data corrected by the first corrector 33. This is because the body 10 stopping at a predetermined position in the first sealing booth SB1 may be displaced from the reference position due to mechanical errors or like occurrences involved in the stopping of the conveyor 4. In view of this situation, reference coordinates of the reference holes 12a, 12b, and 12c in the three-dimensional coordinate system are obtained when the body 10 is at the reference position, and the storage 32 stores the reference coordinates in advance. Then, the second corrector 34 compares the coordinates of the reference holes 12a, 12b, and 12c measured by the position measurer 31 with the reference coordinates, and corrects the teaching data based on the three-dimensional position difference. This configuration minimizes the influence of the above-described displacement relative to the reference position.

Based on the teaching data corrected by the first corrector 33 and the second corrector 34, the controller 35 controls the first sealing robot SR1 to perform the sealant application work with respect to the bottom 11 of the body 10.

The second robot controller 40 (which is a non-limiting example of the robot controller recited in the appended claims) is similar in configuration to the first robot controller 30. Specifically, the second robot controller 40 includes a position measurer 41, a storage 42, a first corrector 43, a second corrector 44, and a controller 45. These elements have approximately the same functions as the functions of the corresponding elements of the first robot controller 30 and will not be elaborated here.

In this embodiment, the first sealing robot SR1 and the second sealing robot SR2 are controlled separately, by the first robot controller 30 and the second robot controller 40, respectively. In another possible embodiment, the first robot controller 30 and the second robot controller 40 may be integrated as one controller. In still another possible embodiment, three or more controllers may be used (which can be implemented by providing an upper-level controller). In still another possible embodiment, the functions of the image processing unit 20 may be incorporated into the robot controller.

In another possible embodiment, the processings performed by the first correctors 33 and 43 and the second correctors 34 and 44 may be performed by a smaller number of correctors or processing elements (for example, a single processing element) or by a larger number of processing elements. In still another possible embodiment, the functions of the first robot controller 30 and the second robot controller 40 may be implemented by programs executed by a CPU 901 (described later by referring to FIG. 6) or may be partially or entirely implemented by a tangible device or devices such as an application specific integrated circuit (ASIC), a field-programmable gate array (FPGA), and other electric circuit.

4. Advantageous Effects of the Embodiment

As has been described hereinbefore, the robot system 1 according to this embodiment includes the first and second sealing robots SR1 and SR2, the three-dimensional sensors 2, the cameras 3, the first correctors 33 and 43, the second correctors 34 and 44, and the controllers 35 and 45. The first and second sealing robots SR1 and SR2 perform sealant application work with respect to the automobile body 10. The three-dimensional sensors 2 detect a three-dimensional shape of the bottom 11 of the body 10, the bottom 11 being subjected to the sealant application work. The cameras 3 detect three-dimensional positions of the body 10 when the first and second sealing robots SR1 and SR2 perform the sealant application work. Based on the three-dimensional shape of the bottom 11 detected by the three-dimensional sensors 2, the first correctors 33 and 43 correct teaching data that specifies the operation of the first and second sealing robots SR1 and SR2. The second correctors 34 and 44 correct the teaching data based on the three-dimensional positions of the body 10 detected by the cameras 3. The controllers 35 and 45 respectively control the first and second sealing robots SR1 and SR2 based on the teaching data corrected by the first correctors 33 and 43 and the second correctors 34 and 44. This configuration provides advantageous effects some of which are described below.

In the robot system 1 according to this embodiment, the cameras 3 detect three-dimensional positions of the body 10 at the time of the sealant application work, and the second correctors 34 and 44 correct the teaching data based on the detected three-dimensional positions of the body 10. This configuration enables the first sealing robot SR1 and the second sealing robot SR2 to more accurately perform the sealant application work with respect to the body 10 even when, for example, the position of the body 10 at the time of the sealant application work is displaced from the reference position.

Also in this embodiment, the three-dimensional sensors 2 detect a three-dimensional shape of the bottom 11 of the body 10, and the first correctors 33 and 43 correct the teaching data based on the detected three-dimensional shape of the bottom 11. This configuration enables the first sealing robot SR1 and the second sealing robot SR2 to more accurately perform the sealant application work with respect to the body 10 even when, for example, the sealing positions based on the reference holes 12a, 12b, and 12c vary from body 10 to body 10 due to an individual difference of each body 10 resulting from machining impreciseness of each body 10. This configuration, as a result, improves accuracy in the sealant application work performed by the first sealing robot SR1 and the second sealing robot SR2.

Also in this embodiment, the robot system 1 includes the conveyor 4. The conveyor 4 is movable in an intermittent manner to convey the body 10 along the conveyance passage CP. The three-dimensional sensors 2 are disposed at positions at which the body 10 being conveyed along the conveyance passage CP is detectable by the three-dimensional sensors 2.

This configuration enables the three-dimensional sensors 2 to detect a three-dimensional shape of the body 10 while the body 10 is being conveyed between the booths WB and SB1. Thus, it is not necessary to make the three-dimensional sensors 2 movable for the purpose of detecting a shape of an entirety of the body 10. This eliminates the need for a robot or a moving device to move the three-dimensional sensors 2, resulting in a simplified system configuration implemented at a reduced cost. Also, it is not necessary to stop the conveyance of the body 10 in order to detect a shape of the body 10. This eliminates or minimizes an extension of tact time.

Also in this embodiment, the robot system 1 includes the encoder 8 and the shape measurer 22. The encoder 8 detects the conveyance speed at which the body 10 is conveyed by the conveyor 4. The shape measurer 22 measures a three-dimensional shape of the body 10 based on the three-dimensional shape of the bottom 11 detected by the three-dimensional sensors 2 and based on the conveyance speed of the body 10 detected by the encoder 8. This configuration provides advantageous effects some of which are described below.

To secure accuracy in the detection of a shape of the body 10 being conveyed, it is preferable to keep the conveyance speed from fluctuating. It is, however, difficult to realize precisely zero fluctuation of the conveyance speed. In view of this situation, in this embodiment, the encoder 8 detects the conveyance speed of the body 10, and the shape measurer 22 measures a three-dimensional shape the body 10 based on the detected conveyance speed of the body 10. This configuration improves accuracy in measuring a three-dimensional shape of the body 10.

Also in this embodiment, the first sealing robot SR1, the second sealing robot SR2, and the cameras 3 are disposed at a plurality of stopping positions (the first sealing booth SB1 and the second sealing booth SB2) of the body 10 along the conveyance passage CP. The three-dimensional sensors 2 are disposed at positions further upstream than the plurality of cameras 3 in the conveyance direction along the conveyance passage CP. This configuration provides advantageous effects some of which are described below.

In this embodiment, a sealing robot and cameras 3 are provided in each of the plurality of sealing booths at which the body 10 is stopped. Specifically, the first sealing robot SR1 and the second sealing robot SR2 perform the sealant application work respectively in the first sealing booth SB1 and the second sealing booth SB2 on one production line with the cameras 3 disposed in each of the booths SB1 and SB2. This configuration enables the first sealing robot SR1 to more accurately perform the sealant application work with respect to the body 10 in the first sealing booth SB1, and enables the second sealing robot SR2 to more accurately perform the sealant application work with respect to the body 10 in the second sealing booth SB2. Also, the three-dimensional sensors 2 are disposed at positions further upstream than the plurality of cameras 3 (that is, the plurality of the booths SB1 and SB2) in the conveyance direction along the conveyance passage CP. This configuration ensures that the three-dimensional shape of the bottom 11 detected by the three-dimensional sensors 2 can be shared between the booths SB1 and SB2. Thus, one position is sufficient for the three-dimensional sensors 2 on one production line, resulting in a simplified configuration of the robot system 1.

Also in this embodiment, based on the three-dimensional positions of the body 10 detected by the cameras 3, the second corrector 34 corrects the teaching data corrected by the first corrector 33; based on the three-dimensional positions of the body 10 detected by the cameras 3, the second corrector 44 corrects the teaching data corrected by the first corrector 43; based on the teaching data corrected by the second corrector 34, the controller 35 controls the first sealing robot SR1, which is disposed in the first sealing booth SB1 in which the cameras 3 used in the correction by the second corrector 34 are disposed; and based on the teaching data corrected by the second corrector 44, the controller 45 controls the second sealing robot SR2, which is disposed in the second sealing booth SB2 in which the cameras 3 used in the correction by the second corrector 44 are disposed. This configuration provides advantageous effects some of which are described below.

In this embodiment, after the first correctors 33 and 43 have corrected the teaching data, the second correctors 34 and 44 correct the teaching data. By employing this order of correction, an upper-level controller that is upper in level than the first robot controller 30 and the second robot controller 40 can be provided so that the upper-level controller controls the first correctors to correct the teaching data while the first robot controller 30 and the second robot controller 40 control the respective second correctors to correct the teaching data. In this case, the teaching data corrected by the first correctors can be shared by the first sealing booth SB1 and the second sealing booth SB2.

Also in this embodiment, the first sealing robot SR1 and the second sealing robot SR2 are sealing robots to spray a sealant onto the automobile body 10; the conveyor 4 is a conveyor to convey the body 10 suspended from the conveyor 4; the three-dimensional sensors 2 are laser sensors to detect a three-dimensional shape of the bottom 11 of the body 10; and the three cameras 3 are cameras to detect the reference holes 12a, 12b, and 12c, which are formed on the bottom 11.

This configuration ensures a sealing robot system in which its first and second sealing robots have improved accuracy in applying sealant onto automobile bodies.

5. Modifications

Modifications will be described below.

5-1. Movable Three-Dimensional Sensors

In the above-described embodiment, the three-dimensional sensors 2 are fixed and detect a three-dimensional shape of the body 10 while the body 10 is being conveyed. In another possible embodiment, the three-dimensional sensors 2 may be movable and detect a three-dimensional shape of the body 10 while the body 10 is stopped. This modification will be described below by referring to FIG. 5.

Figure 5:
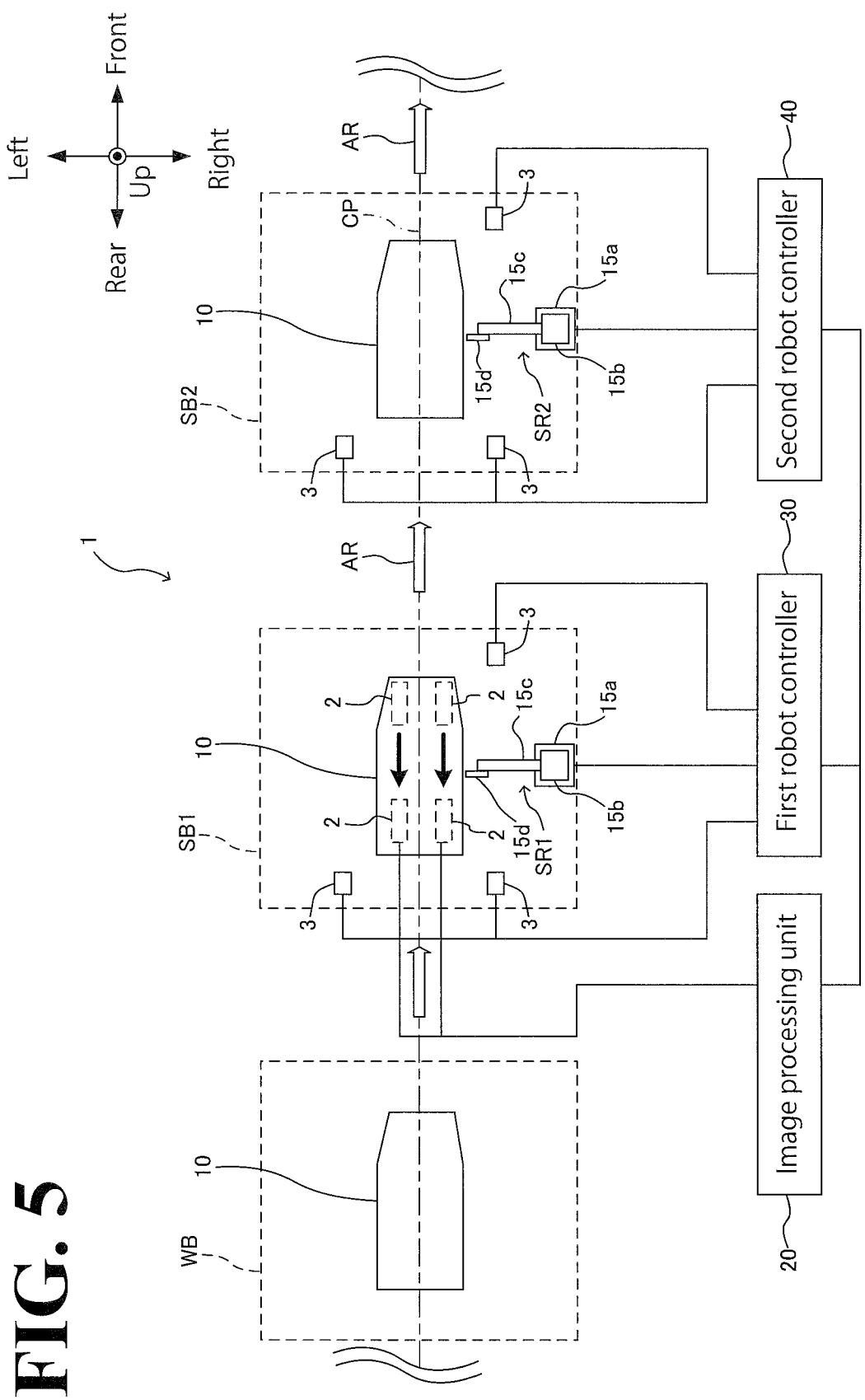
FIG. 5 is a plan view of a robot system according to a modification that includes a movable three-dimensional sensor.

As illustrated in FIG. 5, two three-dimensional sensors 2 according to this modification are disposed in the first sealing booth SB1 and are movable by a sensor driver, not illustrated, in a direction along the conveyance passage CP (this direction corresponds to either the frontward direction or the rearward direction and corresponds to a direction along the vehicle length). While detecting a three-dimensional shape of the body 10 that is in stationary state, the two three-dimensional sensors 2 move over a predetermined distance relative to the body 10. This configuration enables the two three-dimensional sensors 2 to detect a three-dimensional shape of approximately the entire bottom 11 (or a portion of the bottom 11 that is to be subjected to the sealant application work). In this modification, the three-dimensional sensors 2 are disposed in the first sealing booth SB1, and no three-dimensional sensors 2 are disposed in the second sealing booth SB2. The direction in which the three-dimensional sensors 2 are movable may be the rearward direction or the frontward direction (the rearward direction is employed in the modification illustrated in FIG. 5).

A non-limiting example of the sensor driver is a linear motor. In this case, the shape measurer 22 of the image processing unit 20 measures a three-dimensional shape of the bottom 11 based on the three-dimensional shape of the bottom 11 detected by the three-dimensional sensors 2 and based on a detection obtained by a linear scale of the linear motor. The three-dimensional sensors 2 are otherwise similar to the three-dimensional sensors 2 according to the above-described embodiment and will not be further elaborated here.

This modification provides advantageous effects some of which are described below. In the above-described embodiment, the three-dimensional sensors 2 are fixed and detect a three-dimensional shape of the body 10 while the body 10 is being conveyed. With this configuration, if the body 10 is shaken while being conveyed, the three-dimensional sensors 2 may detect the three-dimensional shape of the bottom 11 less accurately. In view of this situation, in this modification, the three-dimensional sensors 2 detect the three-dimensional shape of the bottom 11 while the body 10 is stopped. This configuration eliminates or minimizes the possibility of the body 10 being shaken during detection of the three-dimensional shape of the bottom 11. Thus, the three-dimensional sensors 2 have improved detection accuracy.

5-2. Other Possible Embodiments

In the above-described embodiment and modification, each of the first sealing robot SR1 and the second sealing robot SR2 is a gun-type robot to spray sealant from the sealing gun 15d. In another possible embodiment, each robot may be a roll-coating type robot to apply sealant using a roll, instead of using a gun.

In the above-described embodiment and modification, the first sealing robot SR1 and the second sealing robot SR2 perform the sealant application work with respect to the bottom 11 of the body 10. The first sealing robot SR1 and the second sealing robot SR2 may perform the sealant application work with respect to other than the bottom 11. In another possible embodiment, the first sealing robot SR1 and the second sealing robot SR2 may perform the sealant application work with respect to panel seams on the side surfaces of the front portion 10A of the body 10, with respect to panel seams on the side surfaces (doors) of the middle portion 10B of the body 10, or with respect to panel seams on the side surfaces of the rear portion 10C of the body 10.

In the above-described embodiment and modification, the three-dimensional sensors 2 are fixed or movable in the frontward direction or the rearward direction by a sensor driver. In another possible embodiment, the three-dimensional sensors 2 may be mounted on the sealing robots or other kinds of robots to be movable three-dimensionally in detecting the three-dimensional shape of the body 10. This configuration enables the three-dimensional sensors 2 to detect, for example, a three-dimensional shape of the interior of the body 10.

In the above-described embodiment, the three-dimensional sensors 2 are disposed on the upstream side of the first sealing booth SB1. In another possible embodiment, the three-dimensional sensors 2 may also be disposed on the downstream side of the second sealing booth SB2, in addition to the three-dimensional sensors 2 disposed on the upstream side of the first sealing booth SB1. This configuration enables the robot system 1 to more accurately determine whether sealant has been applied to the body 10 both in the first sealing booth SB1 and the second sealing booth SB2.

The robot system 1 according to this embodiment can be used in applications in which accuracy is required in positioning or locating workpieces (which differ from each other in shape) to be conveyed. Examples of such applications include, but are not limited to, welding to connect together the panels of the body 10, applying a binder to mount a front glass to the body 10, and processing or machining of workpieces other than automobile bodies.

Otherwise, the above-described embodiment and modification may be combined in any manner deemed suitable.

6. Hardware Configuration of Controller

By referring to FIG. 6, description will be made with regard to a hardware configuration of each of the first robot controller 30 and the second robot controller 40 in implementing the processings at the first correctors 33 and 43 and the second correctors 34 and 44 performed by the programs executed at the CPU 901. For ease of description, FIG. 6 omits the function of the first robot controller 30 to supply driving power to the first sealing robot SR1, and omits the function of the second robot controller 40 to supply driving power to the second sealing robot SR2.

Figure 6:
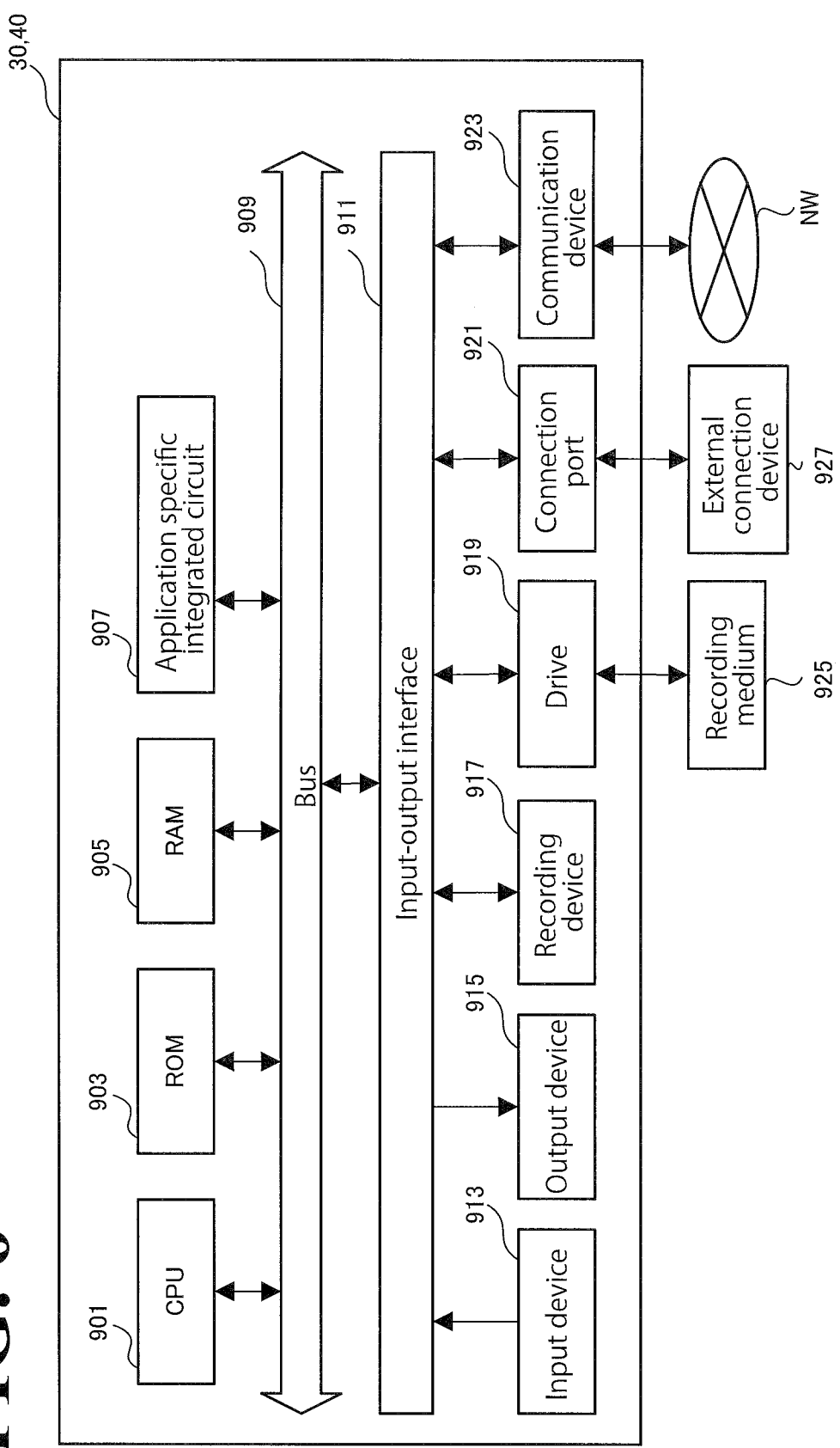
FIG. 6 is a diagram of an exemplary hardware configuration of a controller.

As illustrated in FIG. 6, each of the first robot controller 30 and the second robot controller 40 includes the CPU 901, a ROM 903, a RAM 905, an application specific integrated circuit 907, an input device 913, an output device 915, a recording device 917, a drive 919, a connection port 921, and a communication device 923. Examples of the application specific integrated circuit 907 include, but are not limited to, an application specific integrated circuit (ASIC) and a field-programmable gate array (FPGA). These configurations are connected to each other through a bus 909 and an input-output interface 911 so that signals are transmittable to and from the configurations.

The programs may be stored in, for example, the ROM 903, the RAM 905, or the recording device 917.

In another possible embodiment, the programs may be stored in a removable recording medium 925 temporarily or permanently. Examples of the recording medium 925 include, but are not limited to, a magnetic disc such as a flexible disc; an optical disc such as a compact disc (CD), a magneto-optical (MO) disc, and a digital video disc (DVD);

and a semiconductor memory. The recording medium 925 may be provided in the form of what is called packaged software. In this case, the programs stored in the recording medium 925 may be read by the drive 919 and stored in the recording device 917 through devices such as the input-output interface 911 and the bus 909.

In another possible embodiment, the programs may be stored in a download site or any other recording device such as a computer (not illustrated). In this case, the programs are transmitted to the communication device 923 through a network NW. Examples of the network NW include, but are not limited to, a local area network (LAN) and the Internet. Then, the programs received by the communication device 923 are stored in the recording device 917 through devices such as the input-output interface 911 and the bus 909.

In another possible embodiment, the programs may be stored in an external connection device 927. In this case, the programs are transmitted through the connection port 921 and stored in the recording device 917 through devices such as the input-output interface 911 and the bus 909.

Then, the CPU 901 performs various processings based on the programs stored in the recording device 917 so as to implement the processings performed at the elements such as the first correctors 33 and 43 and the second correctors 34 and 44. In executing the programs, the CPU 901 may read the programs directly from the recording device 917 or may temporarily load the programs in the RAM 905. When the CPU 901 receives the programs through devices such as the communication device 923, the drive 919, and the connection port 921, the CPU 901 may execute the programs without storing the programs in the recording device 917.

As necessary, the CPU 901 may perform the various processings based on signals or information input through the input device 913, such as a mouse, a keyboard, and a microphone (not illustrated).

Then, the CPU 901 may output results of the processings from the output device 915, such as a display device and as sound output device. As necessary, the CPU 901 may send results of the processings through the communication device 923 and the connection port 921 and store the results of the processings in the recording device 917 and/or the recording medium 925.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A robot system comprising:
   at least one robot to work on a workpiece;
   a conveyance unit to convey the workpiece along a conveyance passage;
   a first sensor to detect a three-dimensional shape of the workpiece;
   at least one second sensor to detect a three-dimensional position of the workpiece;
   a third sensor to detect a conveyance speed at which the workpiece is conveyed by the conveyance unit; and
   circuitry configured to
      measure the three-dimensional shape of the workpiece based on the three-dimensional shape detected by the first sensor and based on the conveyance speed detected by the third sensor;
      control the at least one robot to work on the workpiece according to teaching data;
      correct the teaching data according to the three-dimensional shape; and
      correct the teaching data according to the three-dimensional position detected by the at least one second sensor,
   wherein the first sensor is disposed at a position at which the workpiece being conveyed along the conveyance passage is detectable by the first sensor.

2. The robot system according to claim 1,
   wherein the at least one robot comprises a plurality of robots disposed at a plurality of stopping positions of the workpiece along the conveyance passage,
   wherein the at least one second sensor comprises a plurality of second sensors disposed at the plurality of stopping positions of the workpiece, and
   wherein the first sensor is disposed at a position further upstream than the plurality of second sensors in a direction along the conveyance passage.

3. The robot system according to claim 2,
   wherein the circuitry is configured to correct the teaching data according to the three-dimensional position detected by one second sensor among the plurality of second sensors, and
   wherein the circuitry is configured to control, according to the teaching data, one robot among the plurality of robots which is disposed at one stopping position among the plurality of stopping positions at which the one second sensor is disposed.

4. The robot system according to claim 2,
   wherein the robot comprises a sealing robot to apply a sealant to a body of an automobile,
   wherein the conveyance unit comprises a conveyor to convey the body with the body suspended from the conveyor,
   wherein the first sensor comprises a laser sensor to detect a three-dimensional shape of a bottom of the body, and
   wherein the at least one second sensor comprises a plurality of cameras to detect a reference hole disposed on the bottom of the body.

5. The robot system according to claim 3,
   wherein the robot comprises a sealing robot to apply a sealant to a body of an automobile,
   wherein the conveyance unit comprises a conveyor to convey the body with the body suspended from the conveyor,
   wherein the first sensor comprises a laser sensor to detect a three-dimensional shape of a bottom of the body, and
   wherein the at least one second sensor comprises a plurality of cameras to detect a reference hole disposed on the bottom of the body.

6. The robot system according to claim 1, further comprising:
   a sensor driver disposed at a stopping position of the workpiece along the conveyance passage, the sensor driver being configured to move the first sensor,
   wherein the first sensor is configured to detect the three-dimensional shape while the first sensor is being moved by the sensor driver.

7. The robot system according to claim 6,
   wherein the circuitry is configured to correct the teaching data according to the three-dimensional position detected by the at least one second sensor, and
   wherein the circuitry is configured to control, according to the teaching data, the at least one robot when the at least one robot is disposed at a position at which the second sensor is disposed.

8. The robot system according to claim 7,
wherein the robot comprises a sealing robot to apply a sealant to a body of an automobile,
wherein the conveyance unit comprises a conveyor to convey the body with the body suspended from the conveyor,
wherein the first sensor comprises a laser sensor to detect a three-dimensional shape of a bottom of the body, and
wherein the at least one second sensor comprises a plurality of cameras to detect a reference hole disposed on the bottom of the body.

9. The robot system according to claim 6,
wherein the robot comprises a sealing robot to apply a sealant to a body of an automobile,
wherein the conveyance unit comprises a conveyor to convey the body with the body suspended from the conveyor,
wherein the first sensor comprises a laser sensor to detect a three-dimensional shape of a bottom of the body, and
wherein the at least one second sensor comprises a plurality of cameras to detect a reference hole disposed on the bottom of the body.

10. The robot system according to claim 1,
wherein the robot comprises a sealing robot to apply a sealant to a body of an automobile,
wherein the conveyance unit comprises a conveyor to convey the body with the body suspended from the conveyor,
wherein the first sensor comprises a laser sensor to detect a three-dimensional shape of a bottom of the body, and
wherein the at least one second sensor comprises a plurality of cameras to detect a reference hole disposed on the bottom of the body.

11. The robot system according to claim 1,
wherein the first sensor is to detect a three-dimensional shape of a portion of the workpiece to be worked on by the at least one robot, and
wherein the at least one second sensor is to detect the three-dimensional position of the workpiece when the at least one robot works.

12. A method for controlling a robot, comprising:
conveying a workpiece along a conveyance passage;
detecting a conveyance speed at which the workpiece is conveyed;
controlling the robot to work on the workpiece according to teaching data;
detecting a three-dimensional shape of the workpiece using a first sensor;
measuring the three-dimensional shape of the workpiece based on the three-dimensional shape detected by the first sensor and based on the conveyance speed;
correcting the teaching data according to the three-dimensional shape;
detecting a three-dimensional position of the workpiece; and
correcting the teaching data according to the three-dimensional position,
wherein the first sensor is disposed at a position at which the workpiece being conveyed along the conveyance passage is detectable by the first sensor.

13. The method according to claim 12,
wherein a three-dimensional shape of a portion of the workpiece to be worked on by the robot is detected as the three-dimensional shape of the workpiece, and
wherein the three-dimensional position of the workpiece is detected when the robot works.

14. A robot controller comprising:
first circuitry configured to control a robot to work on a work piece according to teaching data;
fourth circuitry configured to measure a three-dimensional shape of the workpiece based on the three-dimensional shape detected by a first sensor and based on conveyance speed at which the workpiece is conveyed;
second circuitry configured to correct the teaching data according to the three-dimensional shape; and
third circuitry configured to correct the teaching data according to a three-dimensional position of the workpiece,
wherein the first sensor is disposed at a position at which the workpiece being conveyed along the conveyance passage is detectable by the first sensor.

15. The robot controller according to claim 14,
wherein the second circuitry is configured to correct the teaching data according to a three-dimensional shape of a portion of the workpiece to be worked on by the robot.

* * * * *